United States Patent [19]

Gleason

[11] 4,142,189

[45] Feb. 27, 1979

[54] RADAR SYSTEM

[75] Inventor: Joseph P. Gleason, Woodland Hills, Calif.

[73] Assignee: The Magnavox Company, Fort Wayne, Ind.

[21] Appl. No.: 424,464

[22] Filed: Jan. 7, 1965

[51] Int. Cl.² ............................................. G01S 9/233
[52] U.S. Cl. ................................. 343/9; 343/17.2 PC
[58] Field of Search .................. 340/347, 348; 332/10, 332/14, 16; 235/152, 92 SH, 92 NG; 343/100.7, 13, 17.1, 17.1 R, 9, 17.2 R, 17.2 PC; 333/1.1, 31 A; 328/37; 307/221 R

[56] References Cited

U.S. PATENT DOCUMENTS

| | | | |
|---|---|---|---|
| 2,951,230 | 8/1960 | Cadden | 235/92 SH X |
| 3,136,950 | 6/1964 | Mackey | 331/1.1 X |
| 3,142,058 | 7/1964 | Rhodes | 343/9 X |
| 3,182,203 | 5/1965 | Miller | 333/1.1 X |
| 3,208,065 | 9/1965 | Gutleber et al. | 343/17.1 R |
| 3,320,410 | 5/1967 | Barrett et al. | 235/92 SH X |
| 3,396,392 | 8/1968 | Fishbein et al. | 343/17.2 R X |

Primary Examiner—T.H. Tubbesing
Attorney, Agent, or Firm—Charles H. Schwartz

EXEMPLARY CLAIM

1. A radar system for determining the range to and velocity of a target comprising the combination of:
    transmitting means for radiating energy at a first particular frequency toward the target,
    encoding means for generating a series of binary encoding pulses having a repetitive pseudo-random pattern, said series including a plurality of groups each of which include the same number of pulses wherein the plurality constitutes an odd number,
    means for operatively interconnecting said encoding means with said transmitting means for modulating the transmitted energy in response to said binary encoding pulses to thereby provide a modulation pattern on said energy,
    gating means operatively interconnected with said transmitting means for periodically gating said transmitting means "ON" and "OFF" at a particular time in successive groups of the binary encoding pulses,
    means operatively interconnected with said gating means to count said binary encoding pulses for actuating said gating means at the particular time in the successive groups so that said gating means will cause said transmitting means to radiate pulses of energy that have their modulation patterns repeat in accordance with the repetition rate of said series of encoding pulses,
    receiving means operative during the intervals between the radiation of said pulses for receiving the energy reflected from the target to provide reflected energy having frequencies that differ from the frequency of the transmitted energy in accordance with the velocity of the target relative to the transmitting means and having modulation patterns substantially identical to but delayed from the transmission pattern in accordance with the range to the target,
    means operatively interconnected with said first encoding means for producing a second series of binary encoding pulses according to said predetermined code and having said pseudo-random pattern,
    means operatively interconnecting said last means with said receiving means for supplying said second series of binary encoding pulses to said receiving means with a time delay substantially equal to the time required for the radiated energy to return from the target, and
    means for comparing said delayed series with the modulation pattern on the reflected signals from the target to provide an output signal having a frequency corresponding to the difference between the frequency of the transmitted energy and the frequency of the energy received from the target.

3 Claims, 5 Drawing Figures

RADAR SYSTEM

The present invention relates to radar systems, and more particularly to a simplified radar system employing a small amount of power while providing a high signal-to-noise ratio.

In one form of radar system, a transmitter is gated on and off so that short pulses of energy are radiated toward a target and reflected back to a receiver. The range or distance to the target is determined from the flight time of the pulses, i.e., the overall time required for a pulse of energy to travel from the radar set to the target and return to the radar set. In order to obtain an accurate measurement of the range, it is necessary to very precisely determine the length of the flight time. Heretofore, to accomplish this, it has been necessary to radiate pulses of sufficiently short time durations to insure the transmitted pulse being terminated before the reflected pulse is received. As a consequence of the short time intervals, in order to radiate a given amount of energy, the power or rate at which the energy is radiated must be very high.

The pulse repetition rate (the number of pulses radiated per second) normally must be sufficiently low to insure the returning pulse being received before the succeeding pulse is transmitted. Thus, as the range to the target increases, the pulse repetition rate must decrease. This, in turn, causes the interval between the pulses to become very long whereby energy can only be radiated for a very small percentage of the time. This effect further increases the power requirements of the transmitting equipment at a time when maximum power is required for maximum range. Accordingly, heretofore radar sets capable of providing accurate measurements have not only been big and bulky, but have also been very expensive and difficult to manufacture. In addition, since the returning echo is of correspondingly short duration, it must have a substantial amount of power to prevent its being "drowned out" by interfering signals from natural or artificial sources. Furthermore, third parties may listen to the transmitted signals and/or reflected signals and derive considerable information such as maximum operating ranges, etc., by analyzing the pulse durations and pulse repetition rate.

In another form of radar system, a transmitter radiates a signal of some predetermined frequency toward the target and then compares the frequency of any reflected signals therewith. If there is a moving target present, the reflected signals will have a frequency that is shifted by an amount that is a function of the radial velocity of the target. Although such systems are effective for many applications, they are unsuitable for others since they can only indicate the relative velocity of a target and not the range. In addition, such systems also have so-called "blind speeds" wherein the speed of the target is so related to the transmitter frequency that the reflected signal is shifted in phase by an integral multiple of 360° and, therefore, produces no phase shift.

It is not proposed to provide a radar system that will overcome the foregoing difficulties. More particularly, it is proposed to provide a small, compact radar system capable of accurately measuring the range to a target and its relative velocity with a minimum amount of power. Moreover, the signals that are radiated have the characteristics of "noise" and, as a consequence, will not only be difficult to detect but will also not reveal any information as to the nature of the radar system or be subject to being "drowned out" or confused by interfering signals from natural or artificial sources.

The foregoing is to be accomplished by providing means for measuring the distance to the target without measuring the particular instant that radiated and/or reflected pulses commence or terminate. Thus, even though the terminal portion of the transmitted pulse and the initial portion of the received or reflected pulse overlap, the range and speed of the target can be measured. As a result, the durations of the pulses do not have to be correlated with the range to a target. It is thereby possible to radiate pulses having extended time durations at even short ranges. Because of the long transmission periods, the peak power of the system may be greatly reduced so as to more closely approach the average power. This, in turn, will permit the accurate and reliable detection of targets at a maximum range with a minimum peak power. The durations of the transmitted pulses and the listening intervals therebetween are not correlated to the range of the detected target by any fixed or predetermined relationship. As a result, a person "listening" to the radiated energy will be unable to determine the range to the radar system.

In order to determine the flight time required for energy to travel to the target and the reflected energy to be returned therefrom, the transmitted pulse may be modulated according to an extended code that has a random or pseudo-random pattern. Because of its apparently random nature and low peak power, the radiated signal will have the general nature of background noise and will be extremely difficult, if not impossible, to detect. During a listening period between the transmission of the pulses, the modulation pattern on the received signal may be correlated with the modulation pattern on the radiated signal. The receiver is very narrow band after the signals are decorrelated and, as a consequence, has a very high signal-to-noise ratio. The amount of time delay between the two modulation patterns will be equal to the flight time of the pulse and will, therefore, be a function of the range to the target. When the received power is very low, the pulses may have longer durations whereby they can be correlated with the transmitted patterns for larger periods of time so as to improve the accuracy when the power of the returning signal is very low. Therefore, a target may be observed at a maximum range with a minimum amount of power. At shorter ranges, the target can be observed even though there is an overlapping of transmitted and received signals because the reflected signals will be of increased strength and can be correlated in the short intervals when the reflected signal persists beyond the transmitted signal.

These and other features and advantages of the present invention will become readily apparent from the detailed description of several radar systems embodying the present invention, particularly when taken in connection with the accompanying drawings wherein like reference numerals refer to like parts, and wherein.

Figure 1:
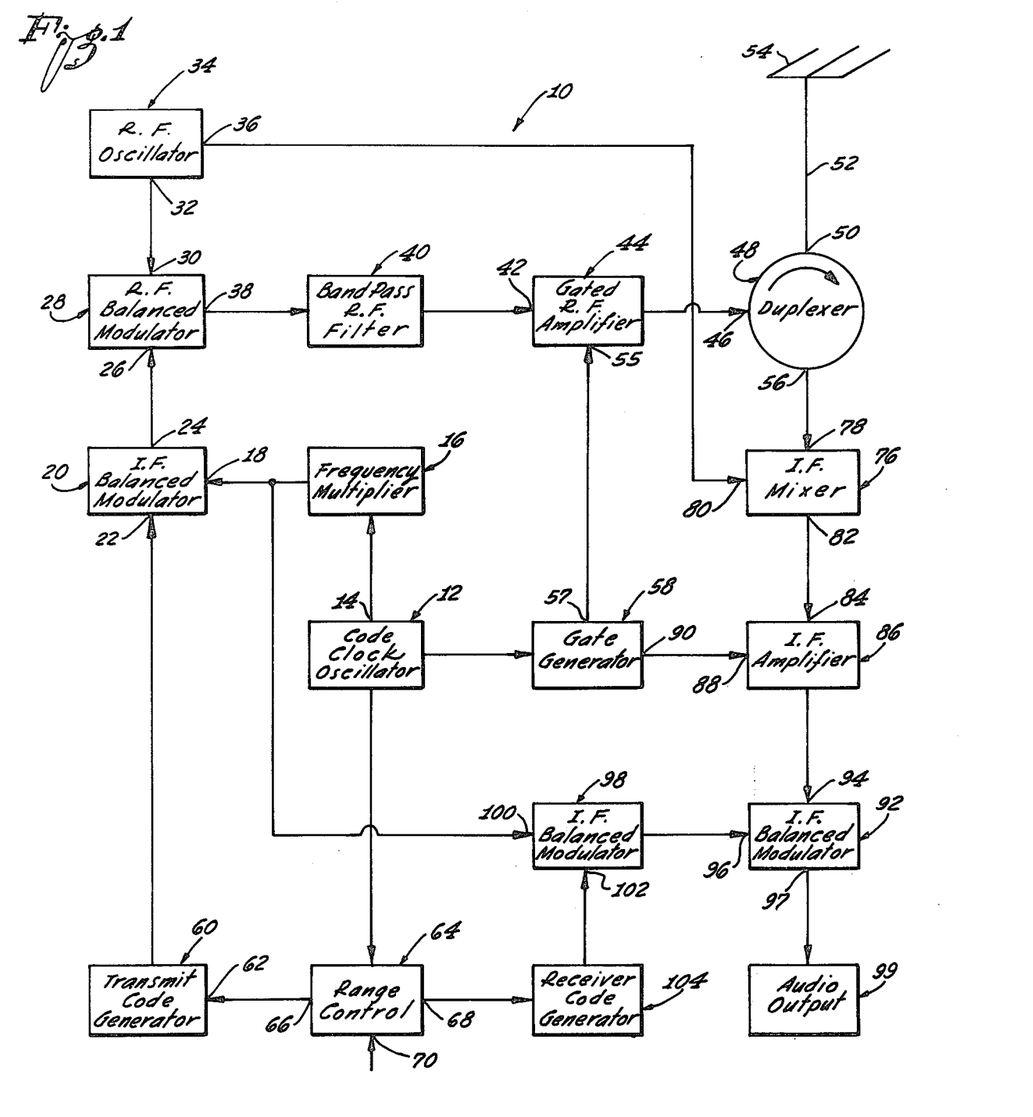
FIG. 1 is a block diagram of a radar system embodying one form of the present invention.

The present invention is particularly adapted to be embodied in a radar system 10 similar to that shown in block form in FIG. 1. Although a radar system of the present nature may be utilized in search and acquisition modes of operation for detecting the presence and location of a target, as will become apparent, in its present form, it is particularly adapted to be embodied in a lightweight and portable radar system that is particularly useful for tracking or observing moving targets.

Referring to the drawings in more detail, the present radar system 10 includes a master clock code oscillator 12. This oscillator 12 may be of any suitable variety capable of oscillating in the desired frequency range with a minimum amount of drift. By way of example, this clock may run at a frequency of about 5 MHz. The oscillator 12 is effective to at least partially control or regulate the various operational parameters of the radar system 10 such as the frequency of the energy that is radiated from the system, the intermediate frequency of the system, the pulse repetition rate at which the radiated pulses are gated "ON" and "OFF", and the durations of the transmitting and receiving periods.

One of the outputs 14 from the oscillator 12 is interconnected with a frequency multiplier 16. This multiplier 16 which may be of any conventional design, is effective to provide a signal having a frequency that is increased above the frequency of the signal from the oscillator 12 by some predetermined amount. The frequency of this signal is preferably in a frequency range that is suitable for use as the IF or the intermediate frequency of the radar set 10. By way of example, a frequency in the region of 60 MHz has been found to be suitable.

The output from the frequency multiplier 16 is interconnected with one input 18 to a modulator 20 for supplying the IF or intermediate frequency signal thereto. The modulator, the details of which will be described more fully hereinafter, has a second input 22 that may receive a modulating signal. The input 22 is interconnected with the output of a code generator 60. This generator, the details of which will be described more fully subsequently, is effective to generate a code signal that is sufficiently distinctive to permit its separation within the system from other similar but unwanted signals. However, it is desirable that it be of a random or pseudo-random nature to prevent its recognition outside of the system 10.

The modulating code signal applied to input 22 will be effective to cause the modulator 20 to modulate the IF signals passing therethrough with the code. The signal present on the output 24 of the modulator 20 will be the IF signal with the same frequency as the signal from the frequency multiplier 16 but it will be modulated by the code signal present on the input 22.

The output 24 from the modulator 20 is interconnected with an input 26 to a mixer or modulator 28. This mixer or modulator 28 may have a second input 30 that is connected to the output 32 of an RF oscillator 34. This mixer or modulator 28 may be effective to heterodyne or beat the modulated IF signal on the input 26 with the RF signals present on the second input 30. The beating of the signals will be effective to produce a plurality of signals which will include the sum and difference side bands of the two input signals.

The oscillator 34 may be of any conventional design effective to produce a substantially constant RF signal on both of the outputs 32 and 36. The frequency of these signals may be of any desired amount but, by way of example, a frequency such as 9.29 KMHz per second is suitable for this purpose.

If the frequency of the oscillator 34 drifts during the flight time of a pulse, a beat frequency signal will be generated that will result in the indication of a moving target. Accordingly, the oscillator 34 should have a low rate of short term drift. More particularly, during an interval equal to the flight time for a target at maximum range, the frequency of the oscillator 34 should not drift by as much at the lowest frequency signal to be detected. As long as the rate of drift is below this, the oscillator 34 can have a larger long-term drift. The maximum permissible long-term drift should not exceed the pass band of the receiver.

The output 32 will feed the RF signal into the modulator 28 where it will beat or heterodyne with the modulated IF signal. Among the resultant signals will be one signal such as the sum that is suitable for radiating as a beam. With an IF signal of approximately 60 MHz and an RF signal of approximately 9.29 KMHz, this sum would be approximately 9.35 KMHz.

In order to eliminate the remaining signals of the undesired frequencies such as the difference, etc., the output 38 of the mixer or modulator 28 may be interconnected with the input to a filter 40. This filter, which may be of substantially conventional design, is preferably of the so-called bandpass variety. The pass band is tuned to be centered about the frequency of the energy to be radiated (for example, 9.35 KMHz). This filter 40 will then permit only signals having frequencies that are to be radiated to pass therethrough. All of the remaining signals having other frequencies will be suppressed.

The output of the filter 40 is interconnected with one input 42 to a gated amplifier 44 so as to feed the modulated signal thereto. This amplifier 44 will be effective to receive the RF signal and amplify it to a more useful power level. The power of this signal is preferably increased to a sufficiently high level to insure the energy being radiated to a target disposed at the maximum intended range of the radar system 10 and reflected back to the radar system with sufficient energy to insure the radar system being capable of recognizing and processing the reflected signals.

The output from the amplifier 44 is interconnected with one port 46 of a circulator or duplexer 48 for feeding the signals thereto. The circulator-duplexer 48 may be of a conventional design and arranged such that energy entering the port 46 will circulate therethrough and emerge through the port 50 while energy entering the port 50 will circulate therethrough and emerge from the port 56.

The port 50 of the circulator-duplexer 48 is interconnected with one end of a transmission line 52 leading to an antenna 54. The antenna 54 may be of any suitable variety which is capable of radiating RF energy into space but it has a sensitivity pattern such that the energy may be radiated in a beam that will cover an intended target area and may be scanned electronically or mechanically through a space whereby the beam may be made to track a target.

It may be seen that the structure described so far will be effective to function as a transmitter for radiating a beam of energy into space toward a target. More particularly, the oscillator 12 and the frequency multiplier 16 will generate an IF signal. The modulator 20 will then modulate the IF signal with a particular code and feed the modulated IF signal to one side of the mixer or modulator 28. The mixer or modulator 28 will then be effective to combine the signals from the modulator 20 and the oscillator 34 to form a modulated signal having the frequency to be radiated. This signal will then be fed through the bandpass filter 40, the gated amplifier 44, the duplexer 48 and thence to the antenna 54 which, in turn, will radiate a beam of energy toward a target.

In order to control the transmission or radiation of the energy from the antenna 54 and provide transmit intervals and a listen or receive interval, the gated amplifier 44 may include gating means for switching the energy "OFF" and "ON". The gating means may be of conventional design and effective to gate energy passing through the amplifier 44 in response to signals present on an input 55. The input 55 is interconnected with an output 57 of a gate generator 58 controlled by the code clock oscillator 12. The gate generator 58 is responsive to the pulses from the oscillator 12 and will produce a periodic control signal such as a squarewave pulse.

The duration of the transmit interval is not critical and it may vary over a wide range. Accordingly, it is possible for it to be of much greater duration than has been possible heretofore. By way of example, this gating signal may be effective to permit the amplifier 44 to be "ON" for an interval approximating the time required for a pulse to travel to and return from a target disposed at the optimum maximum range of the system 10. By way of example, the "ON" interval for the amplifier 44 may be on the order of 20 microseconds for a system that will operate at an optimum maximum range of about 2 miles. When a target is disposed at such a range, the transmission of the pulse will terminate substantially coincident with the commencement of the reflected pulse. The amplifier 44 may then be gated "OFF" for an interval on the order of the transmit period. A listening interval will then be provided during which the reflected pulse may be received.

If the target is disposed at the optimum maximum range, the reflected energy will be received during the entire listening period whereby substantially all of the reflected energy may be received. Thus, even at this maximum range, a large amount of energy will be received and a high signal-to-noise ratio may be obtained. As the range of the target decreases and the flight time becomes shorter, the received signal pulse will commence prior to termination of the transmitted pulse. Although this overlapping of the transmitting and receiving periods will result in a loss of the initial portions of the received signal, the energy in the received pulse will be greater at the shorter ranges and, therefore, the reflected signal will be stronger. Accordingly, the signal-to-noise ratio will still be high. It should be noted that the "OFF" period may be longer or shorter than the "ON" period if so desired. For example, with a transmit interval of about 20 microseconds, the receive period could be 40 microseconds or longer. Although this means the transmitter will be "ON" for less than half of the time, a target may be disposed at a greater range while still permitting receiving of the entire reflected signal.

At least a portion of the energy radiated from the antenna 54 and incident upon a target will be reflected back toward the antenna 54 so as to be received thereby. Because of the Doppler effect, the frequency of the energy will be shifted by an amount that is a function of the radial velocity of the target toward or away from the radar system 10. In addition, the receiving of the pulses of reflected energy will be delayed from the transmitting or distance pulses by an interval that is a function of the range or distance to the target. In addition to the pulse per se being delayed by a time interval equal to the flight time, the code modulation on the pulses will also be delayed by the same amount. It may thus be seen that the range to the target may be determined from the time delay between modulations on the transmitted and received pulses.

The received energy will travel from the antenna 54 along the transmission line 52 to the port 50 of the duplexer 48. The energy will then circulate through the duplexer 48 so as to be discharged through the port 56. In order to utilize the energy and its modulation pattern, the port 56 is connected to receiving means.

The receiving means includes a mixer 76 having a first input 78 and a second input 80. This mixer 76 may be of a conventional design so as to be effective to mix the signals present on the inputs 78 and 80 with each other to thereby produce a signal on the output 82 which has a frequency equal to the difference between the signals on the two inputs 78 and 80. The input 80 is connected to the output 36 of the RF oscillator 34 so as to receive the RF signals therefrom. This RF signal will beat or heterodyne with the reflected energy passing through the duplexer 48 to the mixer 76. This will produce a plurality of signals at the output 82 with one group of signals having a frequency equal to the IF frequency produced by the frequency multiplier 16 in the transmitter portion. In addition, the group will have signals with the frequencies thereof shifted from the intermediate frequency by the Doppler frequency. It should be noted that the signal for beating from the IF frequency up to the RF frequency that is transmitted is identical to that used for beating from the received RF signal down to the IF signal. Accordingly, the IF signals from the output 82 of the mixer 76 will have a frequency exactly identical to the frequency of the IF signal from the IF modulator 20 and/or exactly equal to the IF frequency plus or minus exactly the Doppler frequency shift.

It may thus be seen that the signal at the output 82 of the mixer 76 will be a pulse of energy of IF frequency delayed from the pulse radiated from the antenna by an interval equal to the flight time of the pulse traveling to the target and returning. More important, however, for the present system, is the fact that this IF signal will still have a modulation pattern identical to the transmitted pattern but delayed timewise therefrom by an interval equal to the flight time of the pulse.

The output 82 of the mixer 76 is, in turn, interconnected with one input 84 of a gated IF amplifier 86. This amplifier 86 will be tuned to a band that is centered on the IF frequency and is just wide enough to include the sidebands of plus and minus the Doppler signals. The amplifier 86 which may be of any conventional design, may also include gating means that will be effective to gate the amplifier 86 "ON" and "OFF" in response to signals present on an input 88. The input 88 is connected to the output 90 of the gate generator 58. The signal on this output 90 is similar to the signal on the output 57 in that it is a gating signal. However, the two signals are of an electrically reciprocal nature. That is, when the signal from the output 57 is effective to gate the amplifier 44 "ON" so as to permit transmitting signals, the signal from the output 90 will be effective to gate the amplifier 86 "OFF" so as to prevent receiving signals and to prevent transmitted power leaking through and blocking the receiver. Conversely, when the amplifier 44 is gated "OFF", to prevent transmitting, the amplifier 86 will be gated "ON" to permit receiving signals such as the echoes of the transmitted power.

As previously stated, the transmitting interval may exist for a period that is substantially equal to the flight time required for a radiated pulse to travel to and from a target disposed at an optimum maximum range. Thus, at the instant of time a reflected signal from a target at this range would begin to arrive at the antenna 54, the amplifier 86 will be gated "ON" and will remain "ON" for the interval equal to the transmit interval. Thus, all of the energy reflected from a target disposed at maximum range will pass through the amplifier 86. At closer ranges, the reflected energy will commence arriving at the amplifier 86 sometime before the amplifier is gated "ON". This initial portion of the energy will be lost. However, because of the shorter range, the reflected signal will be of higher power and a larger amount of energy will be received in the remaining interval of reception.

In order to determine the range to the target, it is necessary to determine the flight time for the pulse to make a round trip to the target. However, as has become apparent, the flight times for the pulses per se are not measured. Instead, a determination is made of the amount of time by which the modulation on the received pulse is delayed from the modulations on the transmitted pulses. Although there are numerous ways by which this can be accomplished, in the present instance, the output from the amplifier 86 is connected to the input 94 of means that will be responsive to the modulations on two signals and will indicate any difference therebetween. This means may be a phase detector or similar device or, as in the present instance, it may be a modulator 92. This modulator 92 may be similar to the modulator 20 and include a second input 96 for receiving signals that are modulated the same as the signals from the output 24 of the modulator 20. It may thus be seen that modulator 92 is effective to correlate the transmitted signals and the received signals and the amount of time delay therebetween can be determined. The modulator 92 may also be effective to extract a signal having a frequency equal to the Doppler shift. This signal may then be fed through a suitable audio output 99 to permit identifying the velocity of the target toward or away from the radar system.

The code generator 60 controls the modulation that is present on the signals and may be of any suitable variety and may produce a code of any desired variety. In the present instance, the generator 60 is effective to generate a modulating signal in response to timing pulses from the clock oscillator 12 which pass through a range control 64. The pattern in which the modulating signal varies may be of a periodic nature. However, if various forms of machinery or electronic equipment produce signals that are of a similar periodic nature, they may interfere with the operation of the radar system 10. Accordingly, it has been found desirable for the modulation pattern to vary in a random or psdudo-random pattern. An additional reason for employing a random or pseudo-random pattern is to give the radiated signal many of the characteristics of background noise generally present. Any systems searching for radar signals will find it extremely difficult, if not impossible, to detect and/or to locate the present radar system.

Since background noise or signals from any other source of potentially interfering signals will not vary in an identical pseudo-random pattern as the modulation signal, the possibilities of any interference from such spurious sources will be extremely small.

Accordingly, in the present instance, the generator 60 is effective to generate a modulating signal that is coded in a pseudo-random nature. This is, the signal will appear to vary in a purely random manner; however, over an extended period of time, the pattern may repeat itself in a predictable and reproducible manner.

The output or modulating signal from the code generator 60 may be of any desired variety. However, by way of example, in the present instance the modulating signal is of a binary type. That is, the level of the signal abruptly changes between a higher value and a lower value. These variations will, of course, correspond to the pseudo-random pattern generated in the code generator 60. Generators suitable for producing binary signals that have a pseudo-random pattern are well known in the art. Examples of generators suitable for this purpose are disclosed and described in Technical Report No. 95 of the Massachusetts Institute of Technology, Lincoln Laboratories, published Sept. 12, 1955, by Neil Zierler and entitled "General Binary Sequence Generators".

The code generator 60 has the input 62 thereof connected to the output 66 of a range control 64. This control is connected to the output of the clock 12 and will feed the clock pulses into the generator 60 so as to cause the code bits to pass. In one embodiment of the present system, a code length of 262,143 ($2^{18} - 1$) was employed. This, with a clock rate of about 5 MHz, resulted in the code repeating itself 12½ times per second.

As previously stated, the output of the code generator 60 is connected to the second input 22 of the IF modulator 20 and will feed the binary coded signals into the modulator 20. The modulator 20 may be of any well known variety effective to modulate the signal fed to the first input 18 in response to modulating signals on the second input 22. Although the modulation may be of any desired form such as amplitude or frequency, in the present instance a form of phase modulation is employed.

More particularly, the modulator 20 may be of the balanced type wherein the phase of the energy out of modulator 20 will be inverted each time a signal is applied thereto.

When the binary modulating signal from the generator 60 is at one level, the IF signal at the output 24 may have a first phase angle such as zero. However, when the modulating signal is at the other level, the IF signal at the output 24 may have a second phase angle such as 180°. It may thus be seen that as the IF energy passes through the modulator 20, it will have its phase inverted in a pseudo-random pattern determined by the pseudo-random pattern of the signals from the code generator 60.

This modulated IF signal from the modulator 20 will then be fed through the RF modulator 28 where it will be heterodyned or beat with the signal from the oscillator 34. The resultant signal will pass through the filter 40 to gated amplifier 44. This amplifier 44 will amplify the RF signal while preserving the pseudo-random phase inversion patterns therein. This RF signal will then be gated "ON" and "OFF" by the signals from the gate generator 58 at some predetermined pulse repetition rate such as 16 KHz. The resultant pulses of energy, including their phase inversion pattern, will be radiated toward any targets.

The pulses of energy incident upon any targets in the radiation pattern will be reflected back to the antenna 54. This energy will then travel over the transmission line 52 and through the port 50 of the duplexer 48 where it will circulate and emerge from the port 56. These pulses of energy will then flow through the input 78 into the mixer 76. The signals will then be heterodyned or mixed with the RF signals from the oscillator 34, so as to produce an IF signal substantially identical in frequency to the signal from the multiplier 16. These IF pulses will then flow through the input 84 into the gated IF amplifier 86.

If the target is at the optimum maximum range, the pulses at the input 84 will commence substantially coincident with the instant that the gate generator 58 gates the amplifier 44 "OFF" and the amplifier 86 "ON" whereby the entire pulse including its phase modulation pattern may pass through the amplifier 86. In the event that the target is closer than the maximum range, the reflected pulse will arrive at the input 84 prior to the instant that the amplifier 86 is gated on. This will cause the initial portions of the reflected pulse to be lost; however, the terminal portions of the pulse will pass through the amplifier. Although the duration of the gated portion of the pulse will be shorter than the duration of the received pulse, its power level will be higher than the power from a target at the optimum maximum range. As a result, the energy passing through the amplifier 86 will always be above a usable minimum level.

The gated pulses and the phase inversion patterns will then pass into means such as the modulator 92 for comparing the phase inversion pattern on this pulse with the phase inversion pattern applied to the original transmitted signal. Although this comparison may be accomplished in any suitable manner, the modulator 92 which is substantially the same as the modulator 20 is employed.

An output 68 of the range control 64 is interconnected with a receiver code generator 104 so as to supply the clock pulses thereto. This code generator may be substantially identical to the generator 60 and will thus generate binary coded bits having the same random or pseudo-random pattern that is generated by the generator 60. The range control 64 may employ a time delay means which may be adjusted by means of the input control 70 so as to delay the clock pulses from the output 68. However, it has been found more effective for the range control 64 to be capable of withholding the clock pulses supplied to the code generator to cause the code to fall behind the other code by any predetermined amount. The code generator 104 has its output interconnected with an input 102 of a modulator 98 substantially identical to the balanced modulator 20. The second input 100 for the modulator 98 is interconnected with the output of the frequency multiplier 16 so as to receive the IF signal therefrom. It will thus be seen that the output from the modulator 98 will be an IF signal having its phase inverted in a pattern substantially identical to the pattern on the transmitted pulses. However, the pattern from the modulator 98 will be delayed from the pattern on the transmitted signal by an amount determined by the setting of the control 70 on the range control 64.

The output of the modulator 98 is interconnected with the input 96 so as to feed the IF signals with the delayed modulation into the modulator 92. As previously stated, this modulator 92 is effective to compare the modulations of the signals on the inputs 94 and 96.

More particularly, the modulator 92 may modulate the reflected signal on input 94 by the signal on input 96. If the signal at the input 96 reverses its phase in synchronism with the signal at the input 94, the two signals will reinforce each other. However, if they are not in phase, they will tend to cancel each other and produce no output. If desired, a resonant filter or similar device capable of accumulating energy may be included that has a frequency equal to the intermediate frequency. When the energy from the input 94 is out of phase with the energy from the input 96, destructive interference will occur within the filter and little or no energy will build up. However, in the event that the energy at inputs 94 and 96 are in phase with each other, energy will accumulate so that a signal will be present at the output 97.

In the event the reflecting target is stationary, the frequencies of the signals at inputs 94 and 96 will be identical and the signals at the output 97 will be DC "chopped" into pulses by the gating action of amplifier 86, provided, of course, that the range control 64 has been adjusted to insure that the time delays between the modulations on the inputs 94 and 96 are correlated.

If the correlated target is stationary, the DC level will have a magnitude that is between some minimum level and some maximum level. These two levels are defined by a target range that produces an in-phase relation or a quarter wavelength therefrom to produce an out-of-phase relation. As the range varies between these in and out of phase relations, the DC level will vary between the two extreme levels. At ranges producing non-correlated signals at the inputs, negligible signals will be produced.

In the event of a target at the correlated range having a radial component of velocity, the reflected signal will have a frequency shifted due to the Doppler effect. Thus, even if the control 64 is adjusted to correlate the modulations of the signals at inputs 94 and 96, they will not remain in phase at all times. Instead, they will go in and out of phase at a frequency signal to the Doppler shift. As a consequence, the signal out of the modulator 92 will be a signal having the Doppler shift frequency chopped into pulses by the gating amplifier 86.

When the radiated frequency is in the region of about 9.35 KMHz, the Doppler shift produced by targets moving at a slow rate, such as a walking person, will be in the low end of the audio spectrum. Accordingly, the output 97 may be connected with a conventional audio output system 99 whereby the operator may listen to the beat signal. Thus, if a target such as a man is walking radially relative to the antenna at a range indicated by the setting of control 64, the operator will hear an audio signal. If there are a large number of stationary targets present at the correlated range, they will only produce DC signals at the output 97 and the operator will not hear this because DC signals are blocked by the output circuits of IF balanced modulator 92. In addition, in the event there are other signal sources (such as a second transmitter or reflections from other targets) present in the pattern of the antenna 54, the signals will be received by the antenna. However, the signals will not correlate with the input 96 of IF balanced modulator 92.

Although the foregoing system is operative and can effectively detect targets, it has been found to possess certain operational limitations. More particularly, when a long code such as the 262,143 bit code and a clock frequency of 5 MHz are employed, the code repeats itself approximately 12½ times per second. As a consequence, under some conditions this may produce an objectionable noise signal of 12.5 Hz. This frequency is in the audio range at which target signals are heard. This is particularly true where the gating of the amplifier 44 results in different sections of the code being transmitted on successive cycles. Since the various portions of the code are not balanced as to 1's and 0's, signals from unwanted ranges will be erratic and unpredictable. This unbalance may further aggravate the noise problem. In the event these limitations become of an objectionable magnitude, the embodiment of FIG. 2 may be employed so as to eliminate these and other possible difficulties.

Figure 2:
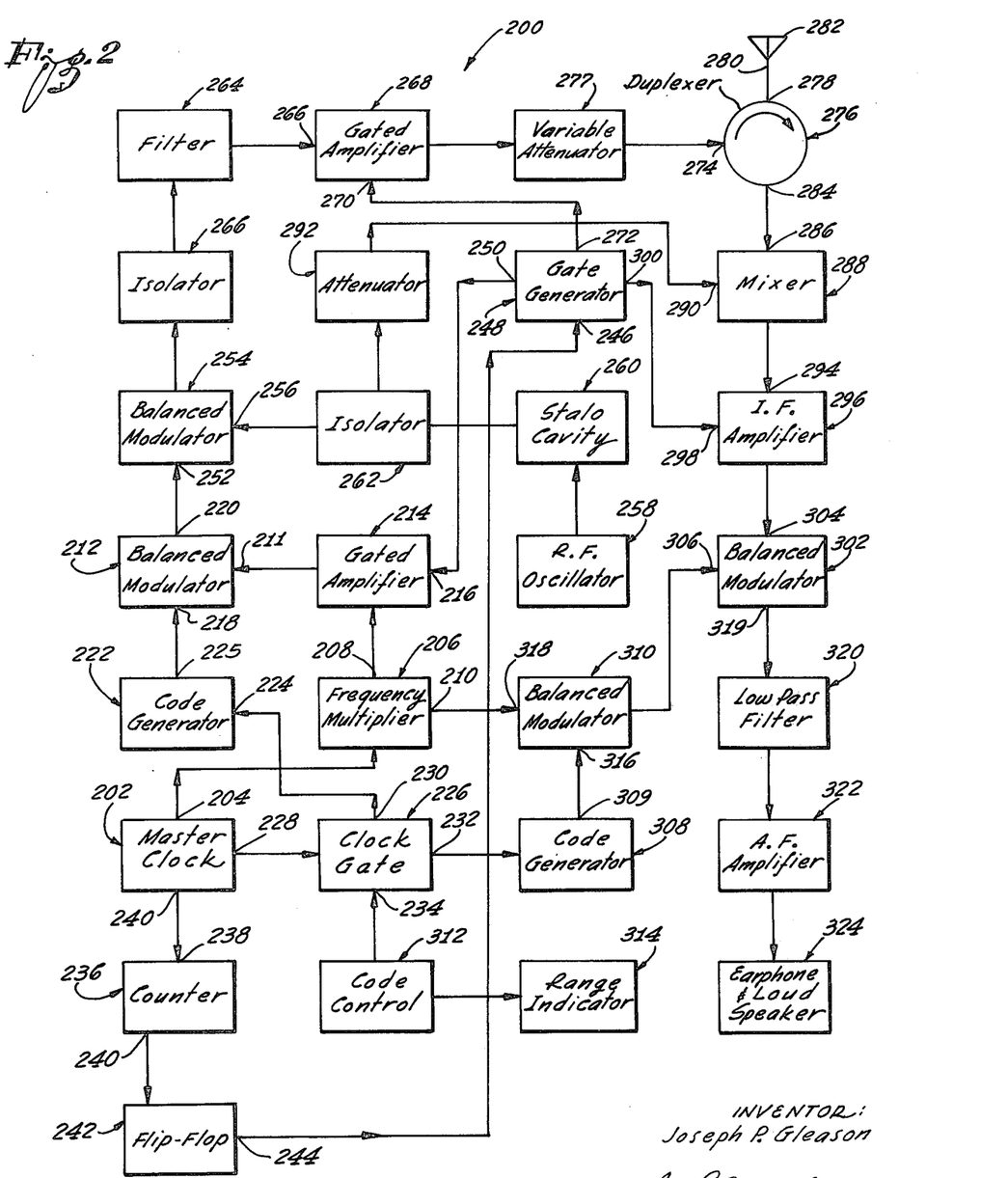
FIG. 2 is a block diagram of a radar system embodying another form of the present invention.

The radar system 200 of FIG. 2 is generally similar to the first system; however, it is somewhat more complex. This system 200 employs a master clock 202 that corresponds to the clock 12 and is effective to control the various functions which occur within the various portions of the system. The clock 202 has several outputs 204, 228 and 240 that provide identical series of timing or clock pulses. Although the frequency at which clock 202 operates may vary over a wide range, by way of example in one operative embodiment, the clock 202 ran at a frequency of roughly 5 MHz. At such a frequency, the clock pulses occur at intervals of approximately 0.2 microseconds. Thus, between each clock pulse, the electromagnetic energy will travel a distance of 200 feet or to a target at a range of 100 feet and return.

The first output 204 of the clock 202 is interconnected with a frequency multiplier 206 that will be responsive to the clock pulses and will be effective to multiply the frequency of the pulses to some higher value. The multiplier 206 has two separate outputs 208 and 210 with each of the outputs being effective to provide signals of identical frequencies. The amount by which the multiplier increases the frequency may vary over a wide range. However, the signal from the multiplier 206 will establish the intermediate frequency of the entire system and accordingly the multiplication provided should produce a signal suitable for such purposes. In the operative embodiment previously mentioned, the multiplier increased the frequency by 12 so that the clock pulse rate of approximately 5 MHz was increased to approximately 60 MHz.

The first output 208 of the multiplier 206 may be interconnected with one of the inputs 211 to a modulator 212 either directly or by means of a gated amplifier 214. The gated amplifier 214 may be gated "ON" and "OFF" in response to signals that are supplied to a second or control input 216. During the "ON" intervals, the amplifier 214 will be effective to amplify the IF signal from the multiplier 206 to a more useful level and feed it into the modulator 212. During the "OFF" intervals, the amplifier 214 will be effective to completely block the IF power and prevent it from leaking into other portions of the system 200.

The modulator 212 includes a second input 218 and is effective to modulate the IF power passing therethrough in accordance with the signals present on the second input 218. Although the form of modulation may be of any desired variety, it has been found advantageous to employ so-called phase modulation wherein the phase of the IF power emerging from the output 220 is either at 0 degrees or 0° + 180°, depending upon which state of a two-level signal is present at the input 218.

The input 218 to the modulator 212 may be interconnected with any suitable source of code signals such as the source described in the first system. However, in this embodiment, the signals are derived from a binary code generator 222 that has the input 224 connected to a clock gate 226 so as to be triggered by the pulses from the gate. The clock gate 226 is, in turn, interconnected with an output 228 from the master clock 202 so as to receive the clock pulses therefrom. The clock gate 226 may be adapted to pass the clock pulses therethrough in virtually unaltered form so that substantially identical trains of clock pulses will be present on the two outputs 230 and 232. However, a code control input 234 may be provided that may cause one or more clock pulses to be inhibited or added to the pulses which are supplied at the outputs 230 and 232. The gate 226 may thus, in effect, shift the code pulse trains relative to each other by an interval equal to the period between the clock pulses.

The code generators 222 and 308 may be of any desired type such as disclosed and claimed in copending application Ser. No. 714,459 filed Feb. 6, 1958. However, it has been found advantageous to employ a code generator similar to the generator 410 in FIG. 3. This code generator 410 includes a transistorized dynamic shift register 412 capable of generating a code with approximately one-half the power and transistors previously required.

Figure 3:
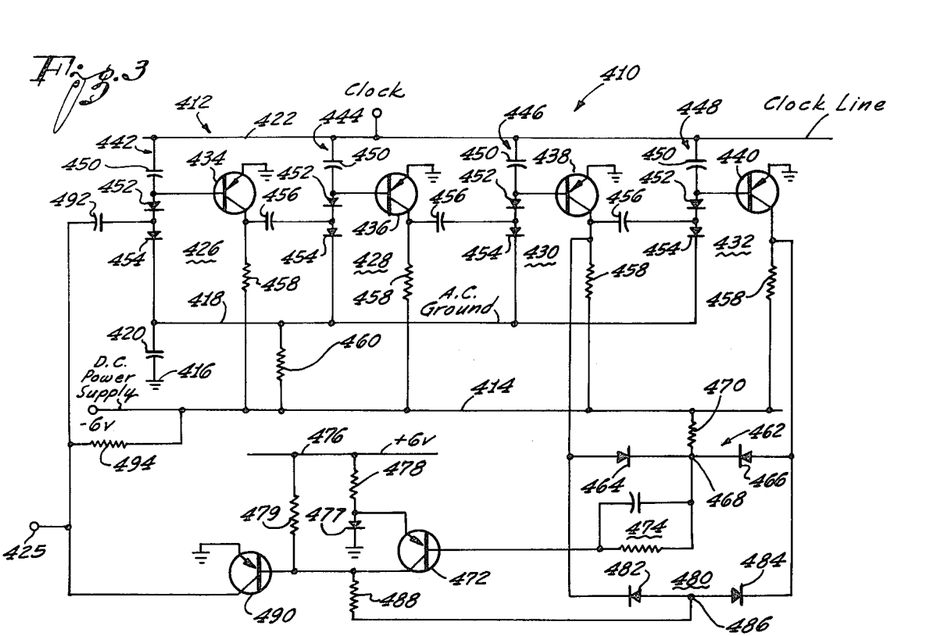
FIG. 3 is a wiring diagram of a code generator.

The generator 410 includes a DC power line 414 having a potential such as −6 volts DC, an electrical ground 416, an AC ground line 418 coupled to ground by a condenser 420, a clock line 422 for carrying the timing or clock pulse, the shift register 412 and an output 425 for providing the coded pulses at the clock frequency. The shift generator 412 includes a plurality of substantially identical stages 426, 428, 430 and 432 that are either in an "ON", or conductive, state or else are in an "OFF", or non-conductive, state. Each stage 426, 428, 430 and 432 is effective to dynamically transfer its state to the next succeeding stage at the clock frequency. The number of stages will, of course, be determined by the number of bits to be contained in the code.

Each stage 426, 428, 430 and 432 includes a transistor 434, 436, 438 and 440 and a network 442, 444, 446 and 448 that extends between the AC ground line 418 and the clock line 422. The networks 442 to 448 include a condenser 450 and a pair of diodes 452 and 454 that are serially connected. The bases of the transistors 434 to 440 are connected to the junctions between the condenser 450 and the diode 452. Each of the emitters is connected directly to ground 416 while each collector is coupled to the junction between the diodes 452 and 454 in the next succeeding stage by means of a coupling condenser 456. The collectors are also connected to the DC supply line 414 by means of biasing resistors 458.

The clock pulses supplied on the clock line 422 are negative going and simultaneously appear across the opposite ends of each of the networks 442 to 448. Assume, first, that all of the transistors 434 to 440 are biased "OFF" and the collectors are not conducting, the collectors will then be at the same potential as DC supply line 414. When a clock pulse occurs, the low negative potential on the collectors will prevent the clock pulse from turning any of the transistors 434 to 440 "ON".

Assume now that one of the transistors is conducting, or "ON". When a transistor, for example transistor 434, becomes conductive, its collector will rapidly rise from the negative potential on the line 414 to a level near ground. This positive going excursion will cause a current to be transmitted through the capacitor 456 and diode 454 to ground. The capacitor 456 now contains a charge. After the clock pulse, the transistor 434 will again become non-conductive or "OFF" and the charge on the coupling condenser 456 will flow through the resistor 458. However, the charge on the condenser will have reduced the back bias on the base of transistor 436 and the transistor 436 will be switched "ON". It will thus be seen that the "ON" state will have been dynamically switched from one stage to the next between the clock pulses. In the event the preceding transistor was "OFF", the coupling condenser 456 would not have been charged and the succeeding transistor would not be turned "ON". Thus, the "OFF" state will also be dynamically transferred to the next stage.

It should be noted that the potential on the AC ground line 418 will drift lower due to the current through the resistor 460. This current flow is balanced by the base current flow through the transistors 434 to 440 and diodes 452 and 454 of the register 412. This characteristic produces a self-starting characteristic that prevents all of the transistors 434, 436, 438 and 440 from remaining non-conductive indefinitely.

An OR gate 462 is connected to the collectors of the third and fourth transistors 438 and 440. This gate 462 includes a pair of diodes 464 and 466 which have the junction 468 between their cathodes connected to the negative supply line 414 by means of a resistor 470. If both the third and fourth transistors 438 and 440 are non-conductive, the junction 468 will be at substantially −6 volts. However, if either or both of the transistors 438 or 440 are conductive, a current will flow through one or both of the diodes 464 and 466 and the potential at the junction 468 will swing in a positive direction so as to produce a positive going pulse having a duration equal to the interval when the transistors 438 and 440 are conducting.

A transistor 472 has the base thereof coupled to the junction 468 by means of a resistor-capacitor network 474. The emitter of the transistor 472 is connected to a positive DC supply line 476 by means of a dropping resistor 478 and to ground by a diode 477. The collector of the transistor 472 is connected to the positive line 476 by a resistor 479.

An AND gate 480 is also connected to the collectors of the third and fourth transistors 438 and 440. This gate 480 includes a pair of diodes 482 and 484 that have their plates connected to a junction 486. This junction 486 is connected to the collector of the transistor 472 by a resistor 488.

An output or driver transistor 490 has its emitter connected to ground 416, its base connected to the junction between the resistors 479 and 488. The collector is coupled to the network 442 by a coupling condenser 492 and connected to the supply line 414 by a load resistor 494.

It will be seen that in the event both of the transistors 438 and 440 are conducting, the junction 486 of the AND gate 480 will be biased high or more positive and there will be no current to turn the transistor 490 "ON". However, in the event that neither of the transistors 438 and 440 is conductive, the junction 486 of the AND gate 480 will be biased low or more negative. Current will then flow through the resistor 488 and through the collector of transistor 472 and transistor 490 will remain non-conductive.

If only the third transistor 438 or only the fourth transistor 440 is conducting, the junction 468 in the OR gate 462 will be biased high or more positive and the base will be positive enough for the transistor 472 to be open. At the same time, the junction 486 in the AND gate 480 will be biased down. As a consequence, the driven transistor 490 will become conductive and the "ON" state of third or fourth stages 430 or 432 will be transferred back to the first stage 426.

The code generator 222 may produce a code which is identical or similar to the very long code which is produced by the code generator 60 in the first system. However, it has been found desirable to employ a code that has a length that is short enough to permit the code bits to occur at the clock rate frequency while permitting the entire code to repeat itself at a frequency that is higher than the passband which is provided in the audio section of the system. For example, if the audio section is capable of passing signals of up to about 800 to 1,000 Hz, a code length of 2,047 bits may be employed. At the clock rate of about 5 MHz previously mentioned, such a code will repeat itself at a rate of approximately 2,400 Hz. This frequency is slightly greater than double the upper limit of the passband of 1,000 Hz. Thus, if this rate is divided into two, the frequency will still leave a resultant which is outside of the audio passband.

For reasons that will become apparent subsequently, it is desirable for the number of bits in the code to be exactly divisible into a large number of groups containing identical numbers of bits. It is also desirable for the number of groups to be odd. As one example, a code of 2,047 bits (2 inches-1) may be divided into exactly 23 groups with each of the groups containing exactly 89 bits. At the frequencies employed in the present system, the bits will be occurring at intervals equal to the flight time for range increments of 100 feet. This will result in the system having a range resolution of 100 feet and with a total of 89 bits in the group the system will have a maximum range of approximately 8,900 feet.

The transmitting and receiving intervals may be synchronized to permit a transmission in accordance with the occurrence of the various groups. Thus, each of the transmitted pulses will be modulated in accordance with the portion of the code contained in one of the groups of code pulses. As a consequence, each of the transmitted pulses will contain an amount of intelligence corresponding to the 89 bits that occurred during the transmission interval.

In order to accomplish the foregoing timing, the gated amplifier 214 may be switched "ON" and "OFF" by a gate generator 248 that is controlled by means responsive to the occurrence of the clock bits. A counter 236 that has an input 238 connected to the output 240 of the master clock 202 will receive all of the clock pulses therefrom. This counter 236 will be effective to count the clock pulses as they occur and each time that a group of 89 pulses occurs, it will produce an output pulse.

One form of counter that is adaptable for this purpose is a so-called 7-stage shift register capable of operating at a clock rate such as the 5 megacycle per second rate. Such a 7-stage shift register would normally have a period equal to that required for 127 bits to occur. In order to modify this count, an AND gate or similar device may be provided which will sense a certain preselected combination or count within a shift register. Whenever this condition occurs within the register, the AND gate will modify the state of the register by injecting a false count of 38. This will cause the counter to skip 38 counts out of the possible 127 and leave only the desired 89 states or conditions possible within the register. Thus, each time that a group of 89 pulses occurs, the shift register will have completed one cycle of count and will be effective to produce a signal on the output 240.

The output 240 of the counter 236 is interconnected with the input to a conventional flip-flop circuit 242. Each time that the counter 236 records the completion of a group of 89 bits, the counter 236 will produce a signal on its output 240 and will cause the flip-flop 242 to invert its stage from a high level to a low level or vice-versa. The output 244 of the flip-flop 242 is interconnected with the input 246 of the gate generator 248. One output 250 of the gate generator 248 is connected with the input 216 to the gated amplifier 214 so as to apply control signals thereto. It may be seen that this arrangement will be effective to switch the amplifier 214 "ON" and "OFF" every time a group of 89 code bits occurs from the code generator 222.

As previously stated, the dividing of the code into groups of 89 bits will produce exactly 23 groups. Because of the odd number of groups, during the generation of the code for the first time, the gated amplifier 214 will be gated "ON" during the intervals that the odd groups are occurring and it will be gated "OFF" during the even groups. During the generation of the code for a second time, the amplifier 214 will be "ON" during the even groups and "OFF" during the odd groups. It will thus be seen that the code must repeat itself twice to complete one sequence wherein all of the bits in the code will have occurred during the "ON" intervals of the gated amplifier 214. Thus, all of the information in the code will not have been utilized until the code has repeated itself twice. In the example given the code has 2,047 bits and repeats itself approximately 1,200 times per second. This, however, is still above the upper limits of the pass band of the audio section.

It may be seen that at a short range of about 300 feet, the energy reflected from the target will arrive at the antenna at about the same time that the third bit is being transmitted, and the last three bits of each group will be the only ones that are received while a signal is not being transmitted. With such a small number of bits being received, there is a high probability that the bits may be all 0's or all 1's. This will make correlation of such targets very difficult and will also unbalance the receiver. By employing a larger number of groups, the last few bits will vary between the successive transmissions. As a consequence, even though there are a small number of bits being received at short range, the probabilities are high that an adequate number of the bits will vary to insure correlating even the close range targets and maintaining a balanced condition in the receiver.

It should also be noted that each time a sequence is repeated, it will be exactly like the preceding sequence. That is, the switching "ON" and "OFF" of the groups will always occur at the same identical points in the code. As a result, each of the groups will occur in identical sequences and the pulses in the corresponding groups in each succeeding sequences will be identical.

Returning now to the output 220 of the modulator 212, it may be seen that the signal at this point will be of intermediate frequency and will be gated "ON" and "OFF" at intervals equal to 89 clock pulses. With a clock rate of about 5 MHz these intervals will be equal to roughly 17.8 microseconds or the flight time required for a transmitted pulse to travel to a target at a range of approximately 8,900 feet and return. During the "OFF" intervals, no IF power will be present at the input 220. However, during the "ON" intervals, the IF power will be present at output 220 and will have its phase modulated by switching between 0 and 180 degrees in accordance with the code bits from the code generator 222.

The output 220 of the modulator 212 is interconnected with an input 252 of a second modulator 254. This modulator 254 will correspond to the modulator 28 in the first system. The other input 256 to the modulator 254 may be interconnected with a source of RF power. This source of RF power may include an RF oscillator 258 having a stable frequency within the range desired. The output of the oscillator 258 may be connected to the input of a stalo (stabilized local oscillator) cavity 260 that will be effective to insure a precisely predetermined frequency for the source of RF energy produced by the oscillator 258. As previously stated, this amplifier should have a short term stability that will prevent a drift of more than the lowest Doppler frequency detected during an interval of the flight time to a target at maximum range. The output from the cavity 260 may, in turn, be connected to the input 256 of the modulator 254 by means of an isolator 262. This isolator 262 will be effective to prevent any of the IF or RF energy present in the modulator 254 being reflected back into the cavity 260 or into the oscillator 258. This will thus prevent any instability resulting from phase locking or other similar effects.

The modulator 254 will be effective to heterodyne or mix the IF and RF signals on the inputs 252 and 256, respectively, to produce a series of signals. This series will include a large number of frequencies such as the IF and RF and sidebands including the sum and difference thereof. Normally, the carrier frequency will be suppressed and the energy will be spread out over a spectrum that includes the upper and lower sidebands. Thus, energy at any given frequency will be relatively small and hard to detect.

The output of the modulator 254 may be connected to a bandpass filter 264 by means of an isolator 266. The filter may be tuned to pass only one band of the signals produced by the modulator 254. For example, in the above mentioned operative embodiment, the oscillator 258 was tuned to generate signals of approximately 9.29 KHMz while the sum band was approximately 9.35 KMHz to which the filter 264 was tuned. All other frequency bands were suppressed and prevented from passing through other portions of the system.

The output of the filter 264 is, in turn, interconnected with one of the inputs 266 of a gated amplifier 268. This amplifier 268 corresponds to the gated amplifier 44 in the first system. This amplifier 268 may include any suitable device such as a traveling wave tube which will be effective to amplify the 9.35 KMHz signal from the filter 264 to a powerful level suitable for radiating into space toward any possible targets.

This amplifier 268 may also be of the gated variety and have a gate control 270 for controlling whether or not the gated amplifier 268 is switched "ON" or "OFF". The input control 270 may be interconnected with a second output 272 from the gate generator 248. This output 272 is synchronized with the output 250 and operated together therewith. This will be effective to cause the gated amplifier 214 and the gated amplifier 268 to both be switched "ON" and "OFF" together. Although it may be possible to switch only one of these amplifiers so as to control the transmission and receiving intervals, it has been found as a practical matter that it is desirable to switch both. This will insure elimination of the leaking of IF power through the system into various portions such as the IF strip in the receiver. The output from the amplifier 268 will be a series of pulses having durations of 89 clock pulses and being separated by intervals of 89 clock pulses and each of these pulses will have its phases modulated to correspond to the 89 bits of code produced by the generator 222.

The output from the amplifier 268 may be interconnected with an input port 274 of a circulator duplexer 276 either directly or by means of a variable attenuator 277. The attenuator 277 will be effective to maintain the radiated power at a level that is so low as to be very difficult, if not impossible, to detect by the enemy.

The circulator duplexer 276 may have another port 278 which is connected to a transmission line 280 and is interrelated with the port 274 so that the energy entering the port 274 will emerge through the port 278 and pass along the transmission line 280. The transmission line 280 leads to an antenna 282 that is effective to radiate the energy into space. It will thus be seen that the pulses of amplified power will pass through the circulator-duplexer 278 and be radiated from the antenna 282 toward any possible targets that may be located in the antenna pattern.

The remaining port 284 of the duplexer 276 is disposed relative to the port 278 so that the power entering the port 278 will be reflected out through the port 284. However, the port 284 is preferably decoupled from the port 274 such that none of the high power radiated pulses may leak out through the port 284. The port 284 is interconnected with one of the inputs 286 of a mixer or similar device 288. It will thus be seen that in the event a target is within the beam of energy radiated from the antenna 282, the pulses of radiated energy will be reflected back to the antenna 282 and pass through the circulator duplexer 276 and into the mixer 288.

The pulses entering the mixer 288 by way of the input 286 will have the same frequency as the energy previously radiated from the antenna if the target is a stationary one. In the event the target is moving and has a component directed radially toward or away from the antenna 282, the frequency of the energy at the input 286 will be shifted from the frequency of the radiated power due to the well known Doppler effect.

The timing of the reflected pulse and the code modulation present on the pulse will be delayed from the interval when the pulse is radiated by the flight time required for the pulse to complete the round trip to and from the target. The second input 290 for the mixer 288 is interconnected with the source of the RF energy of oscillator 258 by means of an attenuator 292. The attenuator 292 is connected to one of the outputs from the isolator 262 so as to receive the RF signal therefrom. The power of this RF signal will be attenuated by the attenuator 292 to a suitable level for use as the local oscillator signal entering the mixer 288. In the embodiment previously mentioned, this RF frequency was about 9.29 KMHz. This RF signal will then be mixed with the reflected energy to produce an output signal of intermediate frequency, i.e., roughly 60 MHz plus or minus any reflection signals that are shifted due to the Doppler effect.

The output of the mixer 288 is, in turn, interconnected with one of the inputs 294 of an IF amplifier 296. This amplifier 296 is tuned to the IF frequency but has a passband of adequate width to accommodate the carrier frequency plus and minus the upper and lower sidebands or signal spectrum created by the balanced modulation. The energies in the signals will be spread over the upper and lower sidebands and the carrier will be suppressed.

This amplifier 296 will be effective to increase the strength of the IF signals and the Doppler signals to a more useful level. In addition, the amplifier 296 may have a control input 298 that will be effective for gating the amplifier 296 "ON" and "OFF" in response to whether or not there are signals present thereon. This control input 298 is connected to an output 300 from the gate generator 248. This output 300 may produce control signals that are the electrical reciprocal of the signals present on the outputs 250 and 272. That is, when the signals on the outputs 250 and 272 gate the amplifiers 214 and 268 "ON", the signals on the output 300 will gate the amplifier 296 "OFF". Conversely, when the signals on the outputs 250 and 272 gate the amplifiers 214 and 268 "OFF" for the receiving period, the signals on the output 300 will gate the amplifier 296 "ON".

As previously indicated, the transmit and receive intervals are of substantially identical durations. Thus, when a target is at the optimum maximum range which in the above mentioned embodiment was 8,900 feet, the reflected pulse will begin arriving at the antenna 282 substantially coincident with the termination of the transmitted pulse and will terminate substantially coincident with the beginning of the succeeding transmit pulse. As a consequence, all of the energy which is reflected from the target located at the optimum maximum range will be received by the system. If the target is at a closer range, the initial portion of the reflected energy will arrive prior to the instant that the amplifier 296 is gated "ON". However, since the pulses are repeated at a high rate even at very close ranges where the terminal portions are very short, the terminal portions of a large number of pulses will be received and available for processing. Also, each of these signals will be of a higher power and sufficient information can be accumulated to correlate at close ranges.

It should be noted that in the event the target is beyond the optimum range, it may still be received and correlated but the signal-to-noise ratio will rapidly deteriorate. First of all, the power of the reflected signal will be decreasing exponentially as the fourth power of the range. In addition, a terminal portion of the reflected energy will be blocked by the amplifier 296 and lost. As the range increases beyond the optimum, this loss will increase until at double the optimum maximum range the reflected signals will be received substantially coincident with the succeeding transmit pulse.

The output of the IF amplifier 296 is interconnected with means for recovering information in the modulation present on the reflected signal to permit determining the range to the target. This means may be similar to that of the first system. It comprises a balanced modulator 302 having a first input 304 and a second input 306 and means for correlating the signals present on the two inputs 304 and 306.

The balanced modulator 302 has the second input 306 interconnected with a coherent source of the coded signals. In the present instance, this source includes a second code generator 308 and an additional modulator 310. The code generator 308 may be substantially identical to the first code generator 222. It includes an input that is connected with the output 232 of the clock gate 226 and receives the clock pulses from the clock 202. Each time that a clock pulse is applied to the input of the generator 308, it will cause a code bit to be produced at the output. The nature of this bit will be determined by the code contained therein which is identical to the code that controls the first code generator 222. Since the two generators 222 and 308 are both driven from the same clock, if the two generators simultaneously start operations at the same points in the codes, the coded signals present at the outputs 225 and 309 will always be identical with each other. In the event one of the generators, for example 308, is operating in a portion of the code that lags behind the portion at which the generator 222 is operating, the coded signal out of the generator 308 will be identical to the signal out of the generator 222 but it will be delayed therefrom by the amount that the generator 308 lags the generator 222. As long as nothing disturbs the manner in which the clock pulses trigger the two generators, the amount of this time delay between the signals will remain constant.

As previously mentioned, the clock gate 226 includes a control input 234 that is effective to control the passage of the clock pulses from the master clock through the gate and out of the two outputs 230 and 232. The input 234 for controlling the gate 226 is interconnected with the output of a code control 312. This control 312 may be actuated either manually or automatically and upon actuation is effective to produce an output signal such as a pulse each time that it is actuated. In the absence of any signal from the code control 312, the gate 226 will permit all of the clock pulses to pass through the gate and the two outputs 230 and 232 will accordingly produce two series of coincident clock pulses. As a consequence, the two generators 222 and 308 will be triggered together and will be effective to produce the two code signals in complete synchronism with each other. In the event the signal from the generator 308 is delayed from the signal out of the generator 222, this delay will remain constant.

In the event the code control 312 is actuated in a manner for increasing the range of the system, a pulse will be applied to the input 234 so as to cause the gate 226 to inhibit the passage of a clock pulse through the output 232. When this occurs, the code generator 222 will still receive the next clock bit from the output 230 and the code signal will continue being generated in its usual way. However, generator 308 will not produce a code bit at that clock beat. As a consequence, the code signal will miss a beat and the amount of its delay will be increased by a period equal to the interval between the master clock pulses. If the clock is operating at 5 MHz, this delay will be equal to 0.2 microseconds.

In the event that the code control 312 is actuated to decrease the range of the system, it will be effective to apply a pulse to the input 234 so as to cause the gate to inhibit the clock pulse occurring at the output 230. This will permit the code signal out of the generator 308 to still advance but will cause the generator 222 to miss a beat relative to the generator 308. As a consequence, the amount of time delay between the two code signals being produced from the two generators will be decreased by a period equal to the interval between the clock pulses. It may thus be seen that each time the code control 312 is actuated, the amount of time delay between the two code signals may be increased or decreased in finite increments equal to the interval between the clock pulses.

In order to keep track of the time differential between the two code signals and therefore the range at which the system is operating, a range indicator 314 may be provided to indicate the number of clock pulses by which the code signals are separated. In the present instance, this is accomplished by operatively connecting the indicator 314 with an output of the code control 312 to sense the difference between the number of times the gate 226 has inhibited the signals from the outputs 230 and 232. If the clock is operating at approximately 5 MHz, the clock pulses will occur at intervals of approximately 0.2 microseconds. Since electromagnetic energy travels approximately 100 feet in 0.1 microsecond, the range control may be calibrated equal to 100 feet for each clock pulse delay of 0.2 microseconds between the two codes. This range indicator 314 may have a visual readout to permit the operator to readily observe the range or indicator 314 may utilize the range information in any desired manner.

The output of the code generator 308 is interconnected with an input 316 of the modulator 310 so as to feed the second code signals to the modulator. The modulator 310 also includes an input 318 which is interconnected with the output 210 of the frequency multiplier 206. The modulator 310 will receive the signals of intermediate frequency from the multiplier 206 and modulate the IF signals with the coded signals from the generator 308. This modulator 310 may be substantially the same as the modulator 212 and effective to invert the phase of the IF signals. The signal out of the modulator 310 will be an IF signal having a frequency identical to the signal from the modulator 212. In addition, the signal from modulator 310 will have its phase modulated or inverted identically to the signal out of the modulator 212. Although these phase modulations will be identical, there will be a time delay between the modulations that is equal to the time delay created by the gate 226 and as recorded by the range indicator 314.

The output of the modulator 310 is interconnected with the input 306 of the modulator 302 so as to feed the time delayed phase modulated IF signals into the modulator 302. This modulator 302 is effective to compare the modulations on the signals present on the two inputs 304 and 306. Although there is a wide variety of means, such as so-called phase detectors, for accomplishing this, one means that has been employed is a resonant circuit. Such a resonant circuit and the inputs thereto may be arranged such that when the signals at the inputs 304 and 306 are 180° out of phase, destructive interference will occur between the two signals and no energy will accumulate in the resonant circuit. However, when the two signals are in phase at the inputs 304 and 306, they will be additive within the resonant circuit. As a result, the energies of signals in phase at the two inputs 304 and 306 will cause energy to accumulate within the resonant circuit so that a strong signal may be obtained from the output 319.

It may be seen that the energies at input 304 from a correlated target will be spread out over the two side bands. The modulator will be effective to function as a balanced modulator and concentrate all of this energy back into the carrier frequency. If an unmodulated signal of carrier frequency arrives at input 304, the balanced modulation will disperse the carrier energy out over the side bands in the same manner as the modulator 254. Thus, even an incoming carrier frequency signal of substantial magnitude will have little or no energy of carrier frequency when it emerges from the output.

Thus, in one embodiment a signal from a target at the correlated range was 1,000 times or 30 decibels greater than the incoming signals of carrier frequency but uncorrelated. If a modulated signal of carrier frequency arrives at the input 304 and the modulation is not correlated with the output from modulator 310, the energy therein will be shifted and further spread.

In the event that the signal from modulator 310 is in phase with the signal from the IF amplifier 296 and the two signals are of identical frequencies (the condition produced by a stationary target), the signal on the output 319 will be a "DC signal" having a squarewave signal with the same frequency as the gating frequency.

In the event that a signal is being reflected from a moving target, the signal at the input 304 will be shifted due to the Doppler effect. If the code control 312 is adjusted to cause the modulation on the signal at input 306 to be correlated with the modulation on the signal at the input 304, the signal on the output 319 will vary in accordance with the two input signals moving into and out of phase with each other. This, of course, will occur at a frequency equal to the difference between the frequencies of the two signals, i.e., the amount of shift produced by the Doppler effect. This beat frequency signal will, of course, be chopped "ON" and "OFF" due to the gating action of the amplifier 296.

It may thus be seen that the signals at the output from the modulator 302 will be of a complex nature having numerous components. Reflections from targets at ranges that are not correlated with the settings of the code control 312 will be discriminated against and suppressed in low pass filter 320. Reflections from stationary targets such as background at the correlated range will produce pulses of gating frequency while reflections from moving targets at the same range will be pulses having frequencies at the Doppler frequencies.

In order to detect the presence of the moving targets, filter means 320 may be provided that will suppress the unwanted signals. The filter 320 may be of the bandpass variety tuned to pass a band of frequencies centered around the frequency at which the amplifiers 214, 268 and 296 are gated "ON" and "OFF". However, it has been found that a greater amount of discrimination can be obtained between the wanted and unwanted targets by employing a low pass filter 320. The pass band of the filter 320 may extend down to DC at its lower end. The upper end of the pass band may terminate at a frequency that is below the frequency at which the code sequence repeats itself so as to eliminate noise from this source. In the present instance, this was indicated as being approximately 1,200 Hz. Accordingly, the upper limit of the filter may be on the order of about 800 to 1,000 Hz.

The output of the filter 320 may be interconnected with an audio frequency amplifier 322 for increasing the strength of the signal to a more useful level and energizing a pair of earphones or loudspeakers 324 to permit a person to listen to the reflected signals.

Figure 4:
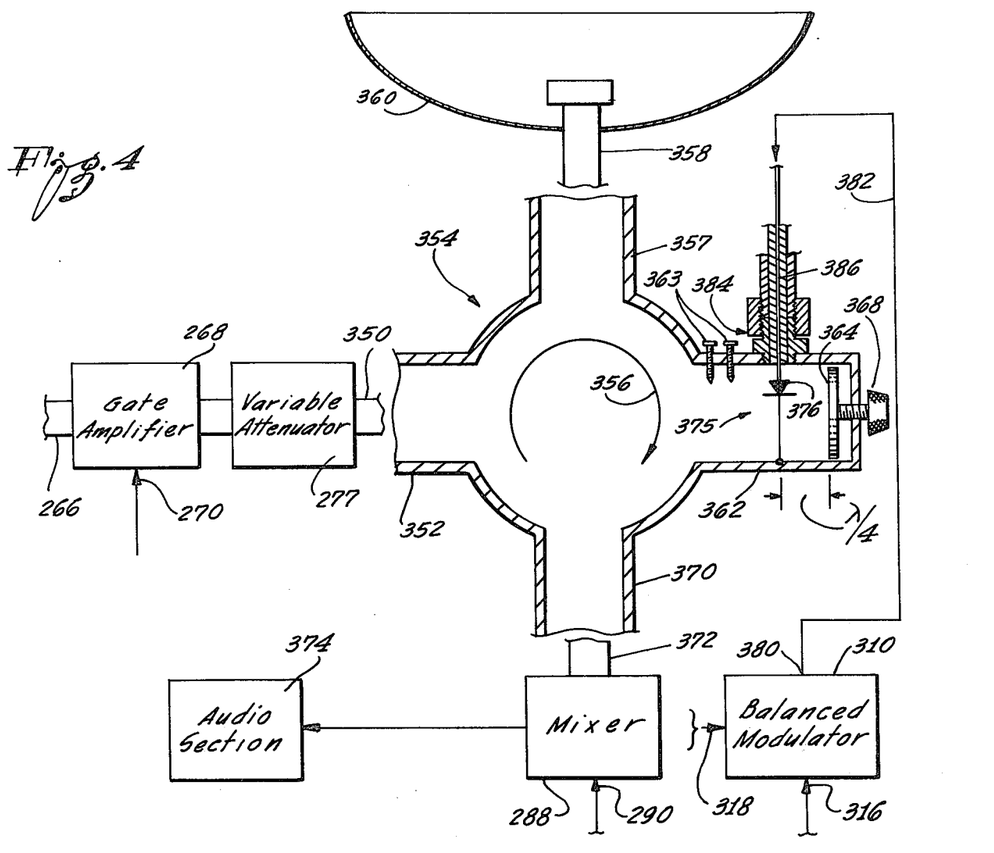
FIG. 4 is a block diagram of a portion of a radar system embodying another form of the present invention.

Although the foregoing systems have been found to be very effective, under some circumstances it may be desirable to modify the systems of FIGS. 1 and 2 in a manner similar to the modification shown in FIG. 4. When modified in this manner, the resultant system may be substantially identical to the systems of FIGS. 1 or 2 except for the coupling between the antenna and the receiver portion of the system and the early stages of the receiver portion.

More particularly, as may be seen from FIG. 4, the modification may include the gated amplifier 268 with the input 266 thereof interconnected with the remaining portions of the system. Thus, the pseudo-randomly modulated carrier will be fed through the input 266 to the gated amplifier 268. The input 270 of the amplifier which may be interconnected with the gate generator 248 for receiving the code signal will gate the carrier wave "ON" and "OFF".

The output of the gated amplifier 268 is interconnected with the input to an attenuator 277 which will be effective to attenuate the gated and modulated carrier wave to the proper level for transmission toward the target. The output 350 of the variable attenuator 277 is interconnected with a suitable transmission line such as a section of waveguide and feeds the signal thereto. The opposite end of the waveguide is interconnected with one arm 352 of a circulator 354 so as to couple the gated and modulated carrier wave from the attenuator 277 into the circulator 354.

The circulator 354 may be constructed out of any suitable transmission means such as a waveguide. The circulator 354 is arranged such that energy entering through one arm will travel in the direction of the arrow 356 and be coupled out of the next succeeding arm. Thus, the energy coupled through the arm 352 will travel clockwise through the circulator as indicated by the arrow 356 and through the arm 357. A section 358 of the waveguide transmission line may be coupled between the arm 357 and the antenna 360 whereby antenna 360 will radiate the energy toward any targets.

In the event that there are targets present in the sensitivity pattern of the antenna 360, energy will be reflected from the target back to the antenna 360. This received energy will then travel through the transmission line 358 and to the arm 357. The energy will then enter the circulator 354 and travel clockwise as indicated by the arrow 356 to the arm 362 and then travel outwardly into the arm 362. This arm 362 may include a pair of tuning screws 363 and a shorted stub 364. This stub is arranged so that substantially all of the energy incident thereon will be reflected therefrom. Preferably, this shorted stub 364 is carried on an adjustable screw 368 so that the position of the stub 364 may be moved axially of the arm 362.

The energy reflected from the arm 362 will travel into the circulator 354 and travel clockwise, as indicated by the arrow 356 and enter the arm 370. This energy may then travel through a section 372 of a transmission line such as a waveguide into a mixer such as the mixer 288. This mixer may correspond to the mixer 288 in the system of FIG. 2 and include an input 290 which may be interconnected with a source of a signal having the frequency of the local oscillator. This will result in the received signal being heterodyned with the carrier frequency to produce an audio frequency signal. This signal may then be fed to an audio section 374 which may correspond to the low-pass filter 320, the audio frequency amplifier 322 and the earphone and/or loudspeaker 324 of FIG. 2. As a consequence, the system may be operated the same as the system of FIG. 2.

The arm 362 of the circulator 354 may be effective to function as a balanced modulator similar to the balanced modulator 302 in the system of FIG. 2. More particularly, the arm 362, in addition to the shorted stub 364, may include a second reflective means 375. In the present instance, this reflective means includes a diode 376 disposed across the waveguide of arm 362 substantially parallel to the E-field. In the event that the diode 376 is non-conductive, the reflective means 375 will appear as an open circuit and little or none of the energy incident on the reflective means will be reflected. Thus, the energy may travel therepast to the stub 364 from whence it will reflect.

However, if the diode 376 is biased conductive, it will act as a shorted stub and substantially all of the energy incident thereon will be reflected back through the arm 362. Preferably, the screw 368 is adjusted to position the stub 364 one-quarter wavelength behind the effective location of the reflective means 375. It may thus be seen that the energy emerging from the arm 362 will have its phase shifted by one-half wavelength or 180° depending upon whether or not it is reflected from the shorted stub 364 or the diode 376.

In order to control the biasing of the diode 376, a balanced modulator corresponding to the balanced modulator 310 of the system of FIG. 2 may be provided. This balanced modulator 310 may include an input 318 which is connected with the frequency multiplier 206. Also, the balanced modulator 310 includes a second input 316 which may be interconnected with a source of the pseudo-random code, for example, the code generator 308.

The balanced modulator 310 includes an output 380 which may be connected to a suitable transmission line such as the coaxial cable 382. The other end of the coaxial cable 382 may be connected with a suitable coupling 384 on the arm 362. The center conductor 386 of the coaxial cable 382 will extend through the coupling 384 and be electrically interconnected with the diode 376 to thereby apply a suitable biasing voltage to the diode. This voltage will be obtained from the balanced modulator 310 and will vary in accordance with the pseudo-random code generated by the code generator 308. It may thus be seen that energy reflected from the target and received by the antenna 360 will enter the arm 357 and circulate into the arm 362. This energy will then be reflected from the arm 362 into the arm 370.

In the process of being reflected in the arm 362, the effective electrical length of the arm 362 will be changed in response to the diode 376 being biased conductive and non-conductive. If a target is disposed at the correlated range, the balanced modulator 310 will be effective to bias the diode 376 "ON" and "OFF" in synchronism with the modulation on the energy being received from the target. As a result, all of this energy will be recombined into a signal of carrier frequency. Thus, energy from a correlated target which is reflected from the arm 362 will be very narrow band and of one particular frequency. Signals from targets at non-correlated ranges or signals of single frequency will be dispersed over a wide band. This, in turn, will permit the mixer 288 and the IF amplifier 296 to be made extremely narrow band. This will not only simplify the design of the mixer and IF amplifier, but will also materially cut down on the signal-to-noise ratio since the pass band of the system may now be greatly reduced.

Figure 5:
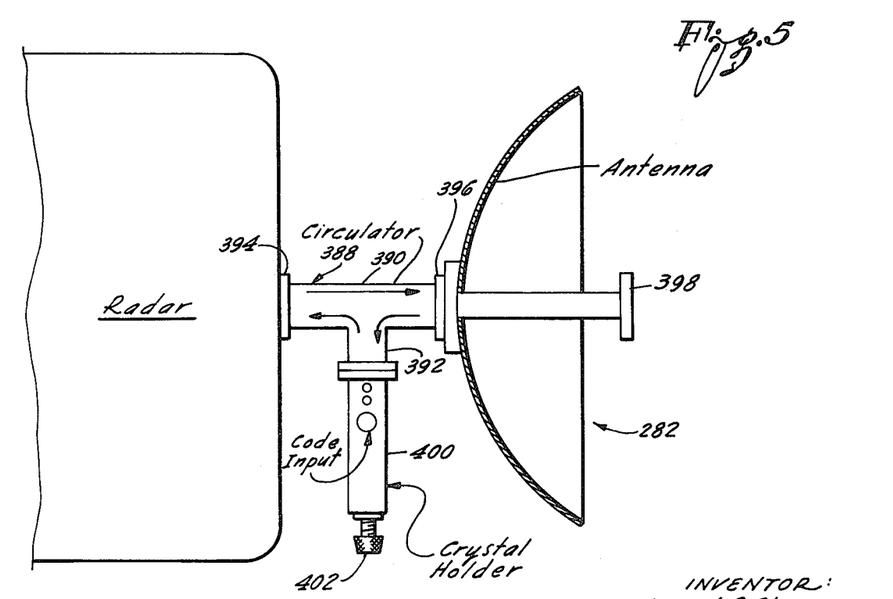
FIG. 5 is a diagram of a portion of a radar system embodying another form of the invention.

As a further alternative, the embodiment of FIG. 5 may be employed. This embodiment is similar to the embodiment of FIG. 4. However, instead of the circulator 276 being connected directly to the antenna 282, an additional circulator 388 is provided. This circulator 388 may have a straight-through section 390 and a branch 392. Energy entering the end 394 of the straight-through section 390 will travel through that section to the end 396. Little, if any, of this energy will be coupled into the branch 392. However, energy entering the end 396 of the straight-through section 390 will travel into the branch 392 and travel through the branch 392 into the straight-through section 390 and will be coupled to the end 394.

The input end 394 is electrically disposed so that the modulated and gated energy is coupled into the straight-through section 390. The output end 396 of the circulator 388 may be interconnected with the active element 398 in the antenna 282. Thus, the gated and modulated energy will flow directly to the antenna 282 and be radiated toward the target substantially identical to FIG. 2. Energy reflected from the target and incident on the antenna 282 will be coupled to the end 396 of the straight-through section 390. This received energy will then be coupled into the branch 392. A short section 400 of waveguide may be connected to the branch 392. A shorted stub may be carried by an adjustable screw 402 at the end of the section 400 so as to reflect energy therefrom. A crystal, diode or similar device may be disposed in the section 400 for reflecting energy therefrom in accordance with the biasing signals applied thereto. The crystal or diode may be connected to a balanced modulator such as 310 so as to receive the biasing signals. The reflected energy will be coupled into the section 390 and flow from the end 394.

It may thus be seen that if the diode is biased "ON" and "OFF" in synchronism with the modulation or energy being reflected from a target at the correlated range, a narrow band signal of carrier frequency will be coupled out of the circulator 388. The output of the circulator 388 may, in turn, be interconnected with the mixer 288 which will feed the signal into the amplifier 298, which now becomes an audio amplifier rather than an I.F. amplifier.

Balanced modulator 302 is now eliminated. Thus, this embodiment will also provide a re-grouping of the correlated energy into an extremely narrow band adjacent the antenna and permit a narrow band system at the input to the received section. At the same time, energy which is not modulated and correlated will be dispersed over a wide band and thereby effectively discriminated against at an early portion of the receiver section.

While only a limited number of embodiments of the present invention have been described and disclosed, it will be apparent to persons skilled in the art that numerous changes and modifications may be made thereto without departing from the spirit of the invention. Accordingly, the foregoing drawings and description thereof are for illustrative purposes only and do not in any way limit the invention which is defined only by the claims which follow.

What is claimed is:

1. A radar system for determining the range to and velocity of a target comprising the combination of:
    transmitting means for radiating energy at a first particular frequency toward the target,
    encoding means for generating a series of binary encoding pulses having a repetitive pseudo-random pattern, said series including a plurality of groups each of which include the same number of pulses wherein the plurality constitutes an odd number,
    means for operatively interconnecting said encoding means with said transmitting means for modulating the transmitted energy in response to said binary encoding pulses to thereby provide a modulation pattern on said energy,
    gating means operatively interconnected with said transmitting means for periodically gating said transmitting means "ON" and "OFF" at a particular time in successive groups of the binary encoding pulses, means operatively interconnected with said gating means to count said binary encoding pulses for actuating said gating means at the particular time in the successive groups so that said gating means will cause said transmitting means to radiate pulses of energy that have their modulation patterns repeat in accordance with the repetition rate of said series of encoding pulses, receiving means operative during the intervals between the radiation of said pulses for receiving the energy reflected from the target to provide reflected energy having frequencies that differ from the frequency of the transmitted energy in accordance with the velocity of the target relative to the transmitting means and having modulation patterns substantially identical to but delayed from the transmission pattern in accordance with the range to the target, means operatively interconnected with said first encoding means for producing a second series of binary encoding pulses according to said predetermined code and having said pseudo-random pattern, means operatively interconnecting said last means with said receiving means for supplying said second series of binary encoding pulses to said receiving means with a time delay substantially equal to the time required for the radiated energy to return from the target, and means for comparing said delayed series with the modulation pattern on the reflected signals from the target to provide an output signal having a frequency corresponding to the difference between the frequency of the transmitted energy and the frequency of the energy received from the target.

2. A radar system for determining the range to and velocity of a target comprising the combination of:

transmitting means for radiating energy at a first particular frequency toward the target, a clock for generating a series of clock pulses at a second particular frequency different from the first particular frequency, encoding means operatively interconnected with said clock for generating a first series of binary encoding pulses at the same frequency as said clock pulses and in synchronism with said clock pulses, said encoding pulses having a repetitive pseudo-random pattern, said first series including a plurality of groups each of which include the same number of pulses, means for operatively interconnecting said encoding means with said transmitting means for modulating the transmitted energy in response to said binary encoding pulses to thereby provide a modulation pattern on said energy, gating means operatively interconnected with said transmitting means for gating said transmitting means "ON" and "OFF" at a particular period in the successive groups of binary encoding pulses, means operatively interconnected with said gating means to count said binary encoding pulses for actuating said gating means at the particular period in the successive groups of binary encoding pulses, receiving means operative during the intervals between the radiation of said pulses of energy for receiving the energy reflected from the target to provide reflected energy having frequencies that differ from the frequency of the transmitted energy in accordance with the velocity of the target relative to the transmitting means and having modulation patterns that are substantially identical to the transmitted modulation patterns but are delayed therefrom in accordance with the range to the target, means operatively interconnected with said clock for producing a second series of binary pulses at the same frequency as said clock pulses, said second series of pulses having said pseudo-random pattern, means operatively interconnected with said last means and with said receiving means for supplying said second series of binary pulses to said receiving means but delayed from the first series by a particular number of clock pulses corresponding to the amount of time required for radiated pulses to return from the target, and means for comparing said delayed series with the modulation pattern on the received pulses to provide an output signal having a frequency corresponding to the difference between the frequency of the transmitted energy and the frequency of the received energy.

3. A radar system for determining the range and velocity of a target comprising the combination of:

transmitting means for radiating energy at a first particular frequency toward the target for reflection therefrom, a clock for generating a series of clock pulses at a second particular frequency different from the first particular frequency, encoding means operatively interconnected with said clock for generating a series of binary encoding pulses at the same frequency as said clock pulses, said encoding pulses having a repetitive pseudo-random pattern, said series including a plurality of groups each of which include the same number of pulses, modulating means in said transmitting means and operatively interconnected with said encoding means and responsive to said encoding pulses for modulating the phase of the transmitted energy depending upon the occurrence or non-occurrence of an encoding pulse to provide a modulation pattern on said transmitted energy, gating means operatively interconnected with said transmitting means for periodically gating said transmitting means "ON" and "OFF" at a third particular frequency between the first and second particular frequencies, means operatively interconnected with said gating means to count said binary encoding pulses for periodically actuating said gating means "ON" and "OFF", receiving means operative during the intervals between the radiation of said pulses of energy for receiving the energy from the target to provide energy having frequencies that differ from the frequency of the transmitted energy in accordance with the velocities of the target relative to the transmitting means and having phase inversions substantially identical to the phase inversions in said transmitted pulses but delayed therefrom in accordance with the range to the target, means for producing a second series of binary pulses at the same frequency as said clock pulses, said second series of binary pulses having said pseudo-random pattern, delay means operatively interconnecting said last means with said clock for supplying said clock pulses to said last means and for delaying the binary pulses in the second series in accordance with the delay between the transmitted and received pulses to provide an indication of the range in accordance with such delay, and means for supplying said second series of binary signals to said receiving means and correlating said binary signals with the phase inversions on the received signals to provide output signals having a frequency representing the velocity of the target relative to the transmitting means.

* * * * *